(12) United States Patent
Petit

(10) Patent No.: US 10,922,086 B2
(45) Date of Patent: Feb. 16, 2021

(54) REDUCTION OPERATIONS IN DATA PROCESSORS THAT INCLUDE A PLURALITY OF EXECUTION LANES OPERABLE TO EXECUTE PROGRAMS FOR THREADS OF A THREAD GROUP IN PARALLEL

(71) Applicant: Arm Limited, Cambridge (GB)

(72) Inventor: Kevin Petit, Great Shelford (GB)

(73) Assignee: Arm Limited, Cambridge (GB)

( * ) Notice: Subject to any disclaimer, the term of this patent is extended or adjusted under 35 U.S.C. 154(b) by 3 days.

(21) Appl. No.: 16/442,471

(22) Filed: Jun. 15, 2019

(65) Prior Publication Data

US 2019/0384613 A1 Dec. 19, 2019

(30) Foreign Application Priority Data

Jun. 18, 2018 (GB) ..................................... 1809955

(51) Int. Cl.
*G06F 9/30* (2018.01)
*G06F 9/38* (2018.01)
*G06T 1/20* (2006.01)

(52) U.S. Cl.
CPC ........ *G06F 9/3853* (2013.01); *G06F 9/30036* (2013.01); *G06F 9/30181* (2013.01); *G06F 9/3851* (2013.01); *G06T 1/20* (2013.01)

(58) Field of Classification Search
CPC ............................ G06F 9/30036; G06F 9/3851
See application file for complete search history.

(56) References Cited

U.S. PATENT DOCUMENTS

| 8,200,940 | B1 * | 6/2012 | Lindholm | ............. | G06F 9/3887 |
| | | | | | 712/22 |
| 10,133,573 | B1 * | 11/2018 | Elsen | .................... | G06F 9/3009 |
| 2012/0079233 | A1 | 3/2012 | Wiedemeier | | |
| 2013/0042090 | A1 * | 2/2013 | Krashinsky | ........... | G06F 9/3887 |
| | | | | | 712/214 |
| 2014/0157287 | A1 * | 6/2014 | Howes | .................... | G06F 9/461 |
| | | | | | 718/108 |

(Continued)

OTHER PUBLICATIONS

EP Combined Search and Examination Report dated Jan. 24, 2019, GB Patent Application No. GB1809955.6.

*Primary Examiner* — Jacob Petranek
(74) *Attorney, Agent, or Firm* — Vierra Magen Marcus LLP

(57) ABSTRACT

To perform a reduction operation to combine data values for threads in a thread group using a data processor, the data processor performs combining steps that each combine the stored combined data value result of a previous combining operation for a thread with the combined data value result of the previous combining operation for a selected another execution lane that has not yet contributed to the stored combined data value result for the thread. The data processor selects as the another execution lane of the execution processing circuitry that has not yet contributed to the combined data value result for the thread, an execution lane from a group of execution lanes whose values have been combined in the previous combining step and that have not yet contributed to the combined data value result for the thread, and having a particular relative position in the group of execution lanes.

17 Claims, 6 Drawing Sheets

(56) References Cited

U.S. PATENT DOCUMENTS

| | | | |
|---|---|---|---|
| 2015/0052330 A1* | 2/2015 | Ingle | G06F 9/3887 |
| | | | 712/2 |
| 2015/0052537 A1* | 2/2015 | Gaster | G06F 9/522 |
| | | | 718/106 |
| 2016/0179537 A1* | 6/2016 | Kunzman | G06F 9/30036 |
| | | | 712/7 |
| 2019/0179637 A1* | 6/2019 | Elsen | G06F 9/3001 |
| 2019/0205138 A1* | 7/2019 | Brown | G06F 9/30018 |

\* cited by examiner

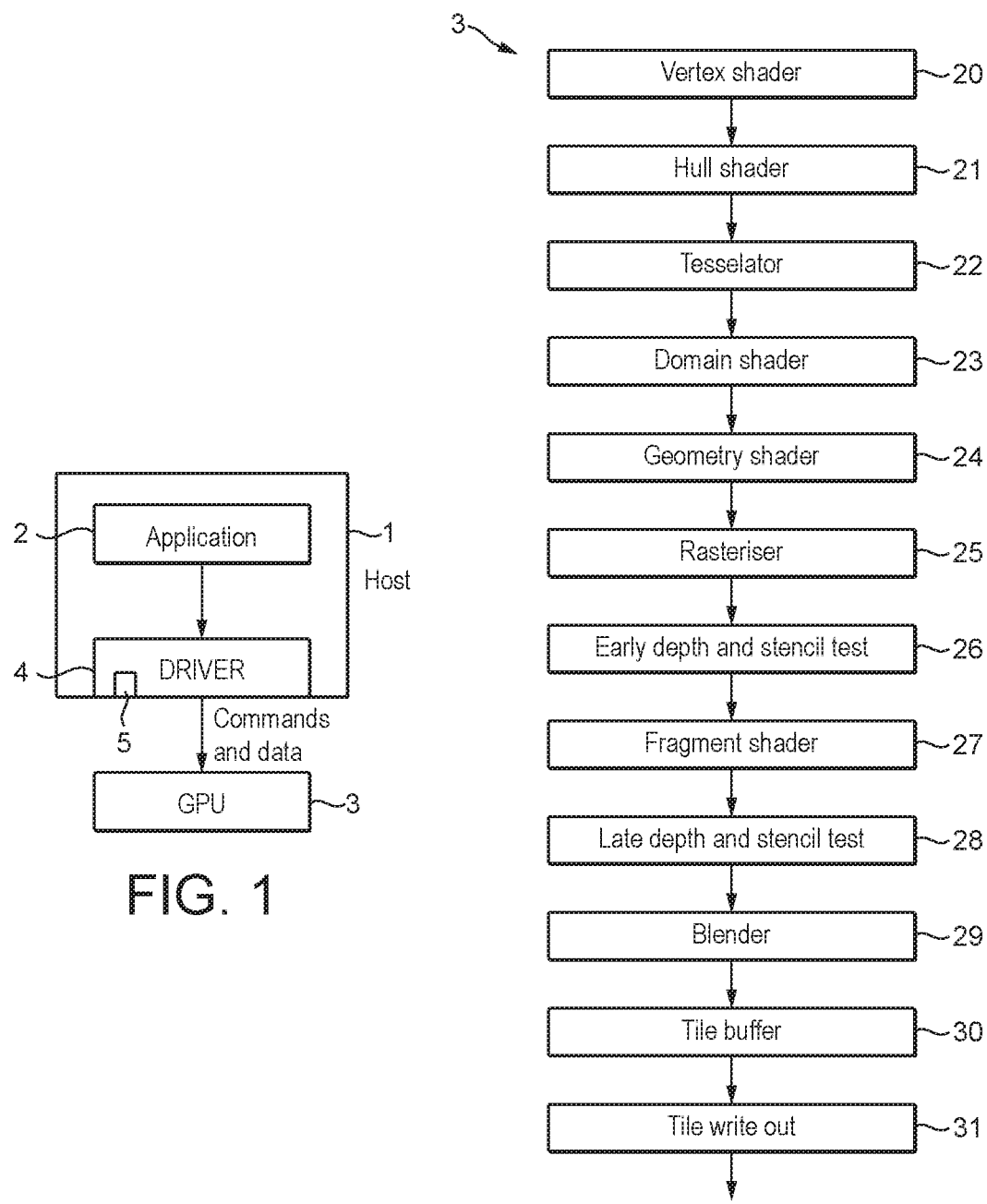

REDUCTION OPERATIONS IN DATA PROCESSORS THAT INCLUDE A PLURALITY OF EXECUTION LANES OPERABLE TO EXECUTE PROGRAMS FOR THREADS OF A THREAD GROUP IN PARALLEL

BACKGROUND

The technology described herein relates generally to the operation of data processing systems that include data processors operable to execute programs to perform data processing operations in which execution threads executing a program to perform data processing operations may be grouped together into thread groups in which the plural threads of a thread group can each execute a set of instructions in lockstep.

An example of such a data processing system and data processor would be graphics processing systems that include a graphics processor that can perform so-called "compute shading" operations, for example in accordance with compute-shader APIs (Application Programming Interfaces), such as OpenCL and Vulkan.

Many graphics processors (and the graphics pipelines that they implement) now include and/or implement one or more programmable processing stages, commonly referred to as "shaders". For example, a graphics processing pipeline will include one or more of, and typically all of: a geometry shader, a vertex shader, and a fragment (pixel) shader.

These shaders are programmable processing stages that execute shader programs on input data values to generate a desired set of output data, such as appropriately shaded and rendered fragment data in the case of a fragment shader. The "shaders" of the graphics processor and processing pipeline may share programmable processing circuitry, or they may each be executed by distinct programmable processing units.

It is also known to use graphics processors and graphics processing pipelines, and in particular shader operation of a graphics processor and graphics processing pipeline, to perform more general computing tasks, e.g. in the case where a similar operation needs to be performed in respect of a large volume of plural different input data values. These operations are commonly referred to as "compute shading" operations, and a number of specific compute shading APIs, such as OpenCL and Vulkan, have been developed for use when it is desired to use a graphics processor and graphics processing pipeline to perform more general computing operations. Compute shading is used for computing arbitrary information. It can be used to process graphics related data, if desired, but is generally used for tasks not directly related to performing graphics processing.

A graphics processing unit (GPU) shader core is thus a processing unit that performs processing by running small programs for each "work item" in an output to be generated. In the case of compute shading operation, each "work item" in the output being generated will be, for example, a data instance (item) in the work "space" that the compute shading operation is being performed on.

A shader program to be executed by a graphics processor will be provided by the application that requires the processing by the graphics processor using a high-level shader programming language, such as GLSL, HLSL, etc. The shader program will consist of "expressions" indicating the desired programming steps defined in the relevant language standards (specifications). The high-level shader program is then translated by a shader language compiler to binary code for the target graphics processor (for the shader core(s) of the graphics processor). This binary code will consist of "instructions" which are specified in the instruction set specification for the given target graphics processor. The compilation process converting the shader language expressions to binary code instructions may take place via a number of intermediate representations of the program within the compiler. The compilation process is typically performed by a driver for the graphics processor (GPU) in question (that is, e.g., executing on a host processor of the overall data processing system that the graphics processor (GPU) is part of), although other arrangements are possible.

In graphics processor shader operation, including in compute shading operation, each work "item" will be processed by means of an execution thread which will execute the instructions of the shader program in question for the work item in question.

The actual data processing operations that are performed by the shader program will be performed by respective functional units, such as arithmetic units, of the graphics processor, in response to, and under the control of, the instructions in the shader program being executed. Thus, for example, appropriate functional units, such as arithmetic units, will perform data processing operations in response to and as required by instructions in a shader program being executed. Typically, there will be a plurality of functional units provided in a graphics processor (GPU), each of which can be respectively and appropriately activated and used for an execution thread when executing a shader program.

The functional units provided in a graphics processor for the purpose of performing operations required by shader programs (and otherwise) may be (and are typically) shared between different shaders (shader stages) of the graphics processing pipeline being executed by the graphics processor. Thus, there will typically be a set of functional units arranged for, and usable for, the execution of shader programs. It would also be possible to provide separate functional units for separate shaders (or for some functional units to be separate and some to be shared), as desired.

Shader program execution efficiency may be improved by grouping execution threads (where each thread corresponds to one work item) into "groups" or "bundles" of threads, where the threads of one group are run in lockstep, e.g. one instruction at a time. In this way, it is possible to share instruction fetch and scheduling resources between all the threads in the group. Other terms used for such thread groups include "warps" and "wavefronts". For convenience, the term "thread group" will be used herein, but this is intended to encompass all equivalent terms and arrangements, unless otherwise indicated.

In a system where execution threads can be grouped into thread groups, the functional units of the shader core for performing the processing operations in response to the instructions in a shader program are normally correspondingly operable so as to facilitate such thread group arrangements. For example, the functional units may be arranged as respective execution lanes, one for each thread that a thread group may contain (such that, for example, for a system in which execution threads are grouped into groups (warps) of eight threads, the functional units may be operable as eight respective (and identical) execution lanes), so that the shader core can execute the same instruction in parallel for each thread of a thread group.

One form of operation that may frequently be performed when performing compute shading on a graphics processor is a so-called "reduction" operation that operates to combine values from a plurality of work items that are being processed. Any binary operation that is commutative and associative can be used as a reduction operator. Thus, the combining operation could be, for example, to sum all of the (data values of) the work items in question, or to multiply all of the (data values of) the work items in question. This may be used, for example, to provide the total sum or product of a set of data values (for example of all or part of a data array).

The Applicants believe that there remains scope for improvements to the performing of such reduction operations in thread group (warp) based data processing systems, such as graphics processing systems.

BRIEF DESCRIPTION OF THE DRAWING

A number of embodiments of the technology described herein will now be described by way of example only and with reference to the accompanying drawings, in which:

FIG. 1 shows an exemplary graphics processing system;

FIG. 2 shows schematically a graphics processing pipeline that can be operated in the manner of the technology described herein;

Like reference numerals are used for like components where appropriate in the drawings.

DETAILED DESCRIPTION

Figure 3:
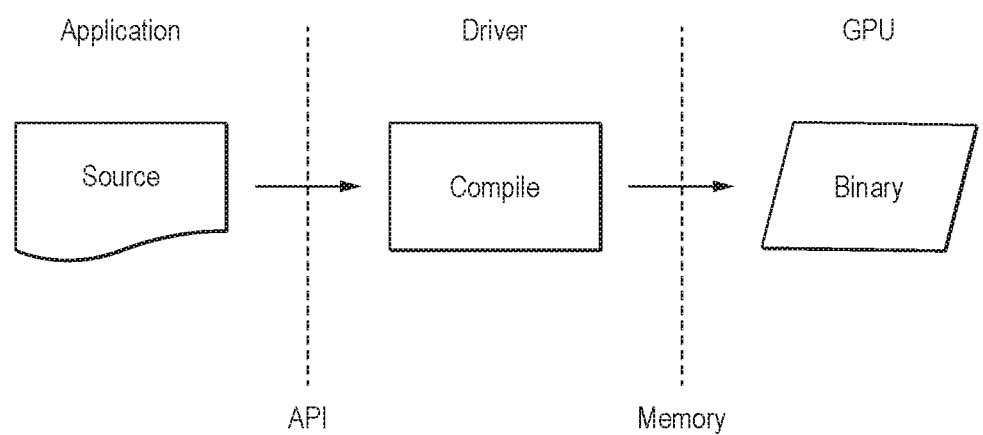
FIG. 3 shows schematically the compiling of a shader program for execution by a graphics processor.

A first embodiment of the technology described herein comprises a method of operating a data processing system, the data processing system including:
  a data processor operable to execute programs to perform data processing operations and in which execution threads executing a program to perform data processing operations may be grouped together into thread groups in which the plural threads of a thread group can each execute a set of instructions in lockstep;
  the data processor comprising execution processing circuitry operable to execute instructions to perform processing operations for execution threads executing a program, the execution processing circuitry being configured as a plurality of execution lanes, each execution lane being operable to perform processing operations for a respective execution thread of a thread group;
the method comprising:
to cause the data processor to perform a reduction operation to combine initial data values for the threads in a thread group in accordance with an operation defined for the reduction operation:
  including in a program to be executed by the execution processing circuitry of the data processor, a sequence of one or more instructions for execution by the execution processing circuitry for performing the reduction operation, the sequence of instructions being operable to, when executed for each thread of a thread group that is being executed by the execution lanes of the execution processing circuitry, perform for each thread of the thread group that is executing the sequence of instructions:
    a first combining step that combines in accordance with the operation defined for the reduction operation, an initial data value for the execution lane for the thread with the initial data value for a selected another execution lane of the execution processing circuitry, and stores the combined data value result of the combining operation for the thread;
    and
    one or more further combining steps that each combine in accordance with the operation defined for the reduction operation, the stored combined data value result of the previous combining operation for the thread with the combined data value result of the previous combining operation for a selected another execution lane of the execution processing circuitry that has not yet contributed to the stored combined data value result for the thread, and store the combined data value result of the combining operation for the thread,
  such that the thread will have stored for it in accordance with the reduction operation, the combination of the initial data values for all the threads of the thread group;
  wherein the sequence of instructions is further configured so as to cause the data processor to, when combining a data value for the thread with the combined data value result of a previous combining operation for a selected another execution lane of the execution processing circuitry that has not yet contributed to the stored combined data value result for the thread, select as the another execution lane of the execution processing circuitry that has not yet contributed to the combined data value result for the thread, an execution lane from a group of execution lanes whose values have been combined in the previous combining step and that have not yet contributed to the combined data value result for the thread, and having a particular relative position in the group of execution lanes;
the method further comprising:
providing the program, including the sequence of one or more instructions for performing the reduction operation, to the data processor for execution by the execution processing circuitry of the data processor;
issuing a group of execution threads to the execution processing circuitry to execute the program for the execution threads of the thread group;
and
the execution processing circuitry of the data processor executing the program, including the sequence of one or more instructions for performing the reduction operation, for the group of execution threads, using a respective execution lane of the execution processing circuitry for each thread of the thread group;
wherein the executing the program for the threads of the thread group comprises, in response to the sequence of one or more instructions for performing the reduction operation, performing for each thread in the thread group:
  a first combining step that combines in accordance with the operation defined for the reduction operation, an initial data value for the execution lane for the thread with the initial data value for a selected another execution lane of the execution processing circuitry, and stores the combined data value result of the combining operation for the thread;
  and
  one or more further combining steps that each combine in accordance with the operation defined for the reduction operation, the stored combined data value result of the previous combining operation for the thread with the combined data value result of the previous combining operation for a selected another execution lane of the execution processing circuitry that has not yet contributed to the stored combined data value result for the thread, and store the combined data value result of the combining operation for the thread, such that the thread has stored for it in accordance with the reduction operation, the combination of the initial data values for all the threads of the thread group;

wherein the executing the program for a thread of the thread group further comprises, in response to the sequence of one or more instructions for performing the reduction operation:

when combining a data value for the thread with the combined data value result of a previous combining operation for a selected another execution lane of the execution processing circuitry that has not yet contributed to the stored combined data value result for the thread, selecting as the another execution lane of the execution processing circuitry that has not yet contributed to the combined data value result for the thread, an execution lane from a group of execution lanes whose values have been combined in the previous combining step and that have not yet contributed to the combined data value result for the thread, and having a particular relative position in the group of execution lanes.

A second embodiment of the technology described herein comprises a data processing system, the data processing system comprising:

a data processor operable to execute programs to perform data processing operations and in which execution threads executing a program to perform data processing operations may be grouped together into thread groups in which the plural threads of a thread group can each execute a set of instructions in lockstep;

the data processor comprising execution processing circuitry operable to execute instructions to perform processing operations for execution threads executing a program, the execution processing circuitry being configured as a plurality of execution lanes, each execution lane being operable to perform processing operations for a respective execution thread of a thread group;

the data processing system further comprising:

processing circuitry configured to include in a program to be executed by the execution processing circuitry of the data processor, to cause the data processor to perform a reduction operation to combine initial data values for the threads in a thread group in accordance with an operation defined for the reduction operation:

a sequence of one or more instructions for execution by the execution processing circuitry for performing the reduction operation, the sequence of instructions being operable to, when executed for each thread of a thread group that is being executed by the execution lanes of the execution processing circuitry, perform for each thread of the thread group that is executing the sequence of instructions:

a first combining step that combines in accordance with the operation defined for the reduction operation, an initial data value for the execution lane for the thread with the initial data value for a selected another execution lane of the execution processing circuitry, and stores the combined data value result of the combining operation for the thread;

and one or more further combining steps that each combine in accordance with the operation defined for the reduction operation, the stored combined data value result of the previous combining operation for the thread with the combined data value result of the previous combining operation for a selected another execution lane of the execution processing circuitry that has not yet contributed to the stored combined data value result for the thread, and store the combined data value result of the combining operation for the thread, such that the thread will have stored for it in accordance with the reduction operation, the combination of the initial data values for all the threads of the thread group;

wherein the sequence of instructions is further configured so as to cause the data processor to, when combining a data value for a thread with the combined data value result of a previous combining operation for a selected another execution lane of the execution processing circuitry that has not yet contributed to the stored combined data value result for the thread, select as the another execution lane of the execution processing circuitry that has not yet contributed to the combined data value result for the thread, an execution lane from a group of execution lanes whose values have been combined in the previous combining step and that have not yet contributed to the combined data value result for the thread, and having a particular relative position in the group of execution lanes;

and processing circuitry operable to:

provide the program, including the sequence of one or more instructions for performing the reduction operation, to the data processor for execution by the execution processing circuitry of the data processor;

the data processor further comprising:

thread issuing circuitry operable to issue a group of execution threads to the execution processing circuitry to execute the program for the execution threads of the thread group;

wherein the execution processing circuitry of the data processor is configured to:

when executing the program, including the sequence of one or more instructions for performing the reduction operation, for a group of execution threads, using a respective execution lane of the execution processing circuitry for each thread of the thread group, in response to the sequence of one or more instructions for performing the reduction operation, perform for each thread in the thread group:

a first combining step that combines in accordance with the operation defined for the reduction operation, an initial data value for the execution lane for the thread with the initial data value for a selected another execution lane of the execution processing circuitry, and stores the combined data value result of the combining operation for the thread;

and one or more further combining steps that each combine in accordance with the operation defined for the reduction operation, the stored combined data value result of the previous combining operation for the thread with the combined data value result of the previous combining operation for a selected another execution lane of the execution processing circuitry that has not yet contributed to the stored combined data value result for the thread, and store the combined data value result of the combining operation for the thread, such that the thread has stored for it in accordance with the reduction operation, the combination of the initial data values for all the threads of the thread group;

wherein the execution processing circuitry is further configured to, in response to the sequence of instructions, when combining a data value for a thread with the combined data value result of a previous combining operation for a selected another execution lane of the execution processing circuitry that has not yet contributed to the stored combined data value result for the thread, select as the another execution lane of the execution processing circuitry that has not yet contributed to the combined data value result for the thread, an execution lane from a group of execution lanes whose values have been combined in the previous combining step and that have not yet contributed to the combined data value result for the thread, and having a particular relative position in the group of execution lanes.

The technology described herein relates to the performance of "reduction" operations in data processors, such as graphics processors, that include a plurality of execution lanes operable to execute programs for threads of a thread group in parallel.

In the technology described herein, when a reduction operation is required, the program instructions that are provided to the data processor to perform the reduction operation are configured so as to, as will be discussed further below, combine the data values in respective execution lanes in such a way that a reduction operation will be performed for a thread group in a more efficient manner than, for example, simply combining the data values for the threads of a thread group one execution lane (thread) at a time (until all the execution lanes have been combined).

Moreover, and again as will be discussed further below, the operation in the manner of the technology described herein can be configured to straightforwardly take account of the presence of any "inactive" execution lanes when a reduction operation is being performed for a thread group. (The Applicants have recognised in this regard that it can be the case that a given thread group for which a program is to be executed may not contain as many threads as there are execution lanes, such that when executing the threads of that thread group, one or more of the execution lanes of the execution processing circuitry may be "inactive" (will not be being used to execute a thread).)

In the technology described herein, when a reduction operation is performed, the result of combining the data values for two execution lanes is stored for the thread (execution lane) in question. That result is then combined with the combined result from a different group of execution lanes, and so on, until all of the (active) lanes have the result of the combination of all of the lanes. Moreover, the reduction operation is configured so as to select as the source of the data value that a thread's current data value is to be combined with in a step of the reduction operation, an execution lane that has a particular relative position in the group of execution lanes that (could) contain the data value that is required.

The Applicants have recognised in this regard that when a reduction operation is performed, as in the technology described herein, by progressively combining data values in respective pairs of execution lanes, then when it is desired, e.g. as a next step, to combine the combined result for a thread with the combined result from a different pair of execution lanes, the combined result from any one of the (active) execution lanes of the combined pair of execution lanes can be used as the source of the data value to combine with the execution lane in question.

Moreover, once plural pairs of execution lanes have been combined, then again when it is desired to combine the result of the combination of those plural pairs of execution lanes with the combined result for another, different group of plural pairs of execution lanes, the combined result from any of the different group of plural pairs of execution lanes that contain the combined result can be used to combine with the another execution lane (and so on). Thus there may be a group of plural execution lanes that contain the required data value for combining to choose from.

The technology described herein exploits this, and operates to, when there is a group of plural execution lanes these have each been combined in previous combining step(s), such that each lane of the group potentially stores the data value that it is desired to combine with, always select the execution lane having a particular relative position in that a group of plural execution lanes (such as (and in an embodiment) the lowest execution lane of the group of plural execution lanes).

As will be discussed further below, this can be used to ensure that whenever an active lane that contains the data value that is required for a combining step exists, an active lane containing the desired data value will always be selected as the source for the data value for the combining operation.

Thus, as will be discussed further below, the operation in the manner of the technology described herein not only makes the execution of the reduction operation more efficient (as it requires less separate combining operation steps to perform the complete reduction operation across an entire thread group), but can also serve to ensure that at any given step in the reduction operation process, an active execution lane (thread) will be selected as the source of the data value to combine with an execution lane (in the event that there is an active execution lane (thread) storing that data value available) (and so can "automatically" take account of the presence of inactive execution lanes when performing the reduction operation for a thread group).

The technology described herein can be used by and on any data processor that supports a programming model where lockstep or apparent lockstep execution of a group of threads is possible and it is desired to share data between the threads of a thread group when executing a program.

In an embodiment, as discussed above, the technology described herein is used for a graphics processor executing a shader program, and so in an embodiment, the data processor is a graphics processor, and the program is a (graphics) shader program.

In this case, in an embodiment, the program to be executed by the graphics processor and that includes the reduction operation, is for performing more general "compute" processing (rather than graphics processing per se), such as in accordance with the OpenCL or Vulkan APIs, or other forms of kernel execution.

The operation in the manner of the technology described herein may be, and is in an embodiment, performed for each and every program to be executed by the data processor that includes a reduction operation or operations (and correspondingly, the operation in the manner of the technology described herein is in an embodiment performed for each instance of a reduction operation in a given program to be executed).

The technology described herein can correspondingly be used for any suitable and desired reduction operation that can be included in a program to be executed by a data processor. It can comprise a mathematical operation or some other binary, e.g. bitwise, operation. It in an embodiment comprises an additive (sum) reduction operation (i.e. an operation to add the (initial) data values of all the threads in a thread group to each other), or a multiplicative (product) reduction operation (i.e. to multiply the (initial) data values for all the threads in a thread group together). It could also be a bitwise operation such as AND, OR or XOR or any other commutative and associative binary operation.

Correspondingly, the operation that is performed on the data values when combining the data values in the respective execution lanes should correspond to the reduction operation in question. Thus, for an additive reduction operation, the operation when combining the data values of different execution lanes will be to determine the sum of those data values. Correspondingly, for a multiplicative reduction operation, the operation that is performed when combining the data values for different execution lanes will be to multiply the data values for the different execution lanes together. For binary operations, such as bitwise operations, such as AND, OR or XOR, the operation that is performed when combining the data values for different execution lanes will be to (bitwise) combine the data values accordingly.

The result of the operation should then be stored appropriately for the execution lane in question. Thus the operation that is defined and used for the reduction operation (and to combine the data values) in an embodiment comprises one of: summing the data values; multiplying the data values; performing a commutative and associative binary operation on the data values; and performing a bitwise operation on the data values.

The technology described herein should (and in an embodiment does) produce some useful output data, such as output data which results from the reduction operation, which may comprise, e.g., graphics processing output data for use in (subsequent) graphics processing operations.

The generated output data may be further processed by the data processing system (such as for display, e.g., in the case of graphics processing output data), and/or may be provided to a display for display.

The program to be executed by the execution processing circuitry will comprise a set of instructions to be executed by the execution threads. As well as including the particular sequence of instructions to perform the reduction operation in the manner of the technology described herein, the set of instructions to be (and being) executed for the program can, and in an embodiment does, otherwise include any desired and suitable instructions that may be executed by the data processor.

The thread groups (the groups of plural threads) that the execution threads executing the program (and the sequence of instructions) are grouped into can be any suitable and desired size. The thread groups are in an embodiment all the same size (at least for a given instance of a program execution). In an embodiment, there is a fixed thread group size that the data processor supports. The thread groups may contain, e.g. 4, 8 or 16 threads (i.e. there is a "warp width" of 4, 8 or 16). Wider thread groups (warps) would be possible, if desired.

Each execution thread and/or thread group can be relate to any suitable and/or desired "work" item (and group of work items) that the program in question is to be executed for. In the case of OpenCL, for example, each execution thread in an embodiment corresponds to a respective OpenCL work item.

The execution threads and thread groups for execution by the execution processing circuitry may be generated and issued to the execution processing circuitry in any suitable and desired manner. This may depend, for example, upon what "work items" the threads and thread groups represent. For example, for compute processing, there will be an appropriate compute processing stage that, e.g., generates the threads and thread groups. There may then, e.g., and in an embodiment, be an appropriate thread group scheduler that issues thread groups to the execution processing circuitry for execution. Other arrangements would, of course, be possible.

The thread groups can be issued to the execution lanes for execution in any suitable and desired manner, such as, and in an embodiment, in a manner appropriate for the data processor in question. The execution lanes will then operate to execute the program, including the sequence of instructions for performing the reduction operation, for the threads of the thread group, e.g., and in an embodiment, in the normal manner for the data processor. Thus the instructions of the sequence of instructions will be executed in turn for each thread in a thread group, in parallel with (and in lock-step with) the other threads in the thread group.

The execution processing circuitry may be operable and arranged as any desired (plural) number of execution lanes. In an embodiment, there are as many execution lanes as the (maximum) number of threads that may be included in a thread group (although other arrangements would be possible, if desired). Thus, in an embodiment, each thread group comprises a particular number of threads, and the execution processing circuitry comprises (in an embodiment exactly) that particular number of execution lanes. Thus in the case where each thread group contains one of 4, 8 or 16 threads, in an embodiment there are 4 or 8 or 16 (and in an embodiment only 4 or only 8 or only 16) execution lanes.

Each execution lane is operable to perform processing operations for a respective execution thread of a thread group. Each execution lane is in an embodiment provided by one or more functional units operable to perform data processing operations for an instruction being executed by an execution thread. Correspondingly, each functional unit should be, and in an embodiment is, able to process as many threads in parallel as there are execution lanes (each functional unit will comprise a set of plural execution lanes).

Each execution lane could comprise overall only a single functional unit, or could comprise plural functional units (and in an embodiment, this is the case). Each execution lane should, and in an embodiment does, comprise overall the same functional unit or units as the other execution lanes (so that each execution lane can operate in the same manner in respect of a thread). Where each execution lane comprises plural functional units overall, then the execution threads could be issued to the functional units effectively as a whole (as a single set of plural functional units) or different (e.g. each) functional units making up the overall execution lane could be treated independently, such that the individual functional units could, e.g., have their own thread group issuing circuitry, with execution threads being issued to the functional units independently of other functional units.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units, store-type units, etc. In an embodiment, the functional units (at least) comprise arithmetic units (i.e. units operable to perform arithmetic (mathematical) operations).

The execution processing circuitry/circuit, execution lanes, and functional units can be implemented as desired and in any suitable manner. They will comprise (be implemented as) suitable hardware elements such as processing circuitry/circuits (logic).

The execution processing circuitry/circuit of the data processor in an embodiment also comprises appropriate control circuitry/circuits (control logic) for controlling the execution lanes (the functional units operating as the execution lanes) to cause them to perform the desired and appropriate processing operations. This can comprise any suitable and desired control circuitry/circuits, such as appropriate thread issuing circuitry/circuits and/or instruction decode circuitry/circuits, etc.

In an embodiment, each execution lane of the execution processing circuitry/circuit has associated with it (and available to it), a set of one or more, and in an embodiment a set of plural, registers for storing data values associated with and for the execution lane (i.e. for storing data values being processed for the execution thread that the execution lane is currently executing). This then facilitates, for example, the handling of execution threads and their data values in an execution lane without the need, e.g., and in an embodiment, to (always) require access to memory (to the memory system of the data processing system). The registers for the execution lanes can be arranged in register file banks, as desired, and as appropriate.

The technology described herein also extends to the operation of execution processing circuitry of a data processor in the manner of the technology described herein.

Thus, an embodiment of the technology described herein comprises a method of operating a data processor, the data processor:
- operable to execute programs to perform data processing operations and in which execution threads executing a program to perform data processing operations may be grouped together into thread groups in which the plural threads of a thread group can each execute a set of instructions in lockstep;
- and comprising execution processing circuitry operable to execute instructions to perform processing operations for execution threads executing a program, the execution processing circuitry being configured as a plurality of execution lanes, each execution lane being operable to perform processing operations for a respective execution thread of a thread group;
- the method comprising:
- the execution processing circuitry of the data processor executing a program for a group of execution threads, using a respective execution lane of the execution processing circuitry for each thread of the thread group; and
- in response to a sequence of one or more instructions in the program, performing for each thread in the thread group:
- a first combining step that combines in accordance with the operation, an initial data value for the execution lane for the thread with the initial data value for a selected another execution lane of the execution processing circuitry, and stores the combined data value result of the combining operation for the thread; and
- one or more further combining steps that each combine in accordance with the operation, the stored combined data value result of the previous combining operation for the thread with the combined data value result of the previous combining operation for a selected another execution lane of the execution processing circuitry that has not yet contributed to the stored combined data value result for the thread, and store the combined data value result of the combining operation for the thread, such that the thread has stored for it the combination of the initial data values for all the threads of the thread group;
- wherein the executing the program for a thread of the thread group further comprises, in response to the sequence of one or more instructions:
- when combining a data value for the thread with the combined data value result of a previous combining operation for a selected another execution lane of the execution processing circuitry that has not yet contributed to the stored combined data value result for the thread, selecting as the another execution lane of the execution processing circuitry that has not yet contributed to the combined data value result for the thread, an execution lane from a group of execution lanes whose values have been combined in the previous combining step and that have not yet contributed to the combined data value result for the thread, and having a particular relative position in the group of execution lanes.

An embodiment of the technology described herein comprises a data processor, the data processor:
- being operable to execute programs to perform data processing operations and in which execution threads executing a program to perform data processing operations may be grouped together into thread groups in which the plural threads of a thread group can each execute a set of instructions in lockstep;
- and comprising execution processing circuitry operable to execute instructions to perform processing operations for execution threads executing a program, the execution processing circuitry being configured as a plurality of execution lanes, each execution lane being operable to perform processing operations for a respective execution thread of a thread group;
- wherein the execution processing circuitry of the data processor is configured to:
- in response to a sequence of one or more instructions included in a program, perform for each thread in a group of execution threads being executed using a respective execution lanes of the execution processing circuitry:
- a first combining step that combines in accordance with an operation, an initial data value for the execution lane for the thread with the initial data value for a selected another execution lane of the execution processing circuitry, and stores the combined data value result of the combining operation for the thread; and
- one or more further combining steps that each combine in accordance with the operation, the stored combined data value result of the previous combining operation for the thread with the combined data value result of the previous combining operation for a selected another execution lane of the execution processing circuitry that has not yet contributed to the stored combined data value result for the thread, and store the combined data value result of the combining operation for the thread, such that the thread has stored for it the combination of the initial data values for all the threads of the thread group;

wherein the execution processing circuitry is further configured to, in response to the sequence of instructions, when combining a data value for a thread with the combined data value result of a previous combining operation for a selected another execution lane of the execution processing circuitry that has not yet contributed to the stored combined data value result for the thread, select as the another execution lane of the execution processing circuitry that has not yet contributed to the combined data value result for the thread, an execution lane from a group of execution lanes whose values have been combined in the previous combining step and that have not yet contributed to the combined data value result for the thread, and having a particular relative position in the group of execution lanes.

As will be appreciated by those skilled in the art, the technology described herein can, and in an embodiment does, include any one or more or all of the features of the technology described herein described herein, as appropriate.

Once a thread group has executed the sequence of instructions to perform the reduction operation, each thread of the thread group will, and in an embodiment does, store (have stored for it) the overall result of the reduction operation.

The results generated by executing the sequence of instructions to perform the reduction operation may be used as desired. For example, they may be output, e.g. to external memory, and/or they may be provided for, and used by, further instructions in the set of instructions (in the program) being executed. Other arrangements would, of course, be possible.

In all cases, the results may be used by the data processing system to generate an output. The output that is generated can be any suitable and desired output, such as a render output or other information, such as metadata, for a set of data values, such as a data array. It could also or instead be, for example, an output for a "softmax function" (for example for neural network processing), an output for an FFT and/or DCT, an output for a vector reduction, etc.

The operation in the manner of the technology described herein will be repeated for each thread group that the reduction operation is to be performed for. The results for each thread group may then be further combined (reduced), if desired.

The sequence of one or more instructions that is provided to the data processor for execution by the execution processing circuitry to perform the reduction operation causes the execution processing circuitry to carry out a sequence of (successive) combining steps for each thread in a thread group.

The first combining step combines an initial data value for the execution lane for a thread with the initial data value for a selected another execution lane of the execution processing circuitry, and stores the combined data value result of the combining operation for the thread.

This is then followed by one or more further combining steps. The number of further combining steps should be, and is in an embodiment, sufficient to combine the data values for all of the execution lanes (and so may depend upon how each individual combining step is configured and the number of execution lanes). Thus, depending on the number of combining steps that are required, there may be one further combining step, or more than one further combining step.

Thus, in an embodiment, there is a second combining step that combines in accordance with the operation defined for the reduction operation, the stored combined data value result of the first combining step for the thread with the combined data value result of the first combining step for a selected another execution lane of the execution processing circuitry that has not yet contributed to the stored combined data value result for the thread, and stores the combined data value result of the second combining step for the thread.

In embodiments, there may then be a third combining step that combines in accordance with the operation defined for the reduction operation, the stored combined data value result of the second combining step for the thread with the combined data value result of the second combining step for a selected another execution lane of the execution processing circuitry that has not yet contributed to the stored combined data value result for the thread, and stores the combined data value result of the third combining step for the thread (and so on, if required).

In an embodiment, the sequence of instructions is operable so as to progressively combine the data values in the execution lanes in a pairwise manner. Thus it is in an embodiment operable to cause the execution processing circuitry to, in a first step, combine (in accordance with the operation for the reduction operation) the (initial) data values for respective pairs of, in an embodiment adjacent, execution lanes, such that each execution lane in the pair of execution lanes will then store (have associated with it) the result of combining the data values for the two execution lanes in the pair.

The instruction sequence is then in an embodiment configured so as to, and to be operable to, combine in a next step the data values from one pair of execution lanes that were combined in the first step, with the data values for a different (and in an embodiment adjacent) pair of execution lanes that were combined in the first step (and to, when performing this combination operation, (always) select as the execution lane in the another pair of execution lanes that were combined in the first step to combine with the execution lanes in the current step, the execution lane of that pair that has a particular relative position in the pair (e.g. the lowest lane of the pair)).

If further pairwise combining operations are needed to combine the data values of all the execution lanes, then the instruction sequence is in an embodiment operable to perform a further, corresponding, pairwise combination, in which each execution lane in one pair of pairs of (i.e. in a quad of) execution lanes that have been combined is combined with the data value of a selected execution lane of a different (and in an embodiment adjacent) pair of pairs (quad) of execution lanes that have previously been combined in earlier combining steps of the process, and so on, until each execution lane stores the appropriate combination of the initial data values for all of the execution lanes.

This operation will accordingly require $\log_2 n$ combining steps, where n is the number of execution lanes. Thus if there are 4 execution lanes, 2 combining steps will be needed, if there are 8 execution lanes, 3 combining steps will be needed, and so on.

The sequence of one or more instructions that is provided to the data processor for execution by the execution processing circuitry to perform the reduction operation can be any suitable and desired sequence of one or more instructions that will cause the data processor to perform the reduction operation in the manner of the technology described herein.

In an embodiment, the sequence of instructions that is used to perform the reduction operation in the manner of the technology described herein comprises a sequence of respective pairs of instructions, with each pair of instructions performing a respective combining step.

In this case, the first instruction in a (and each) pair of instructions in an embodiment selects a source execution lane whose data value is to be combined with the data value for the execution lane that is executing the instruction, with the second instruction in the pair then performing the appropriate operation for the reduction operation using the data value from the selected source execution lane and the data value for the execution lane that is executing the instructions. Thus, for example, a first instruction in the pair of instructions will select an execution lane as the source of the data value that is to be combined with the data value for the execution lane that is executing the instruction, and will be followed by an, e.g., addition instruction, that will add the data value from the source execution lane to the data value for the execution lane that is executing the instructions.

Successive pairs of such source execution lane selection and reduction operation instructions can then be included in the sequence of instructions to progressively combine the data values of all the execution lanes in the desired manner.

The instruction that selects the source execution lane in an embodiment also operates to transfer the required data value from the selected source execution lane to the execution lane (to the thread) that is executing the instruction, and in an embodiment operates to load the data value for the selected source execution lane into a register that is associated with the execution lane that is executing the instruction. Thus the source execution lane selection instruction in an embodiment specifies a register for the execution lane that is executing the instruction to store the data value from the source execution lane in. It can, and in an embodiment does, also indicate the register associated with the source execution lane from which the data value should be retrieved.

The reduction operation instruction should, and does in an embodiment, indicate the operation to be performed using the data values. It in an embodiment also indicates the registers associated with the execution lane that is executing the instruction where the data values to be combined are stored, and/or (and in an embodiment and) a destination register where the result of the operation using the data values is to be stored.

Other arrangements would, of course, be possible.

When performing a combining step for a thread, the sequence of instructions is configured so as to cause the data processor to select as the "source" execution lane for the data value to be combined with in the combining step, an execution lane from a group of execution lanes whose values have been combined in the previous combining step and that have not yet contributed to the combined data value result for the thread that is performing the combining step.

In this regard, the sequence of combining steps of the technology described herein will operate to progressively combine, for each thread, data values from other execution lanes, such that at any given time, a respective thread will store the combined data values for a group of plural execution lanes. The number of execution lanes that a thread stores the data values for will depend upon the number and configuration of the combing steps, but in the case where the combining steps combine the execution lanes in a progressive, pairwise, manner, then after the first combining step, a thread will have the combined data value for a pair of execution lanes, after the next combining step the thread will have the combined data value of two pairs of execution lanes (so four execution lanes), and after the third combining step, the thread will have the combined data value for a group of eight execution lanes (and so on, if required).

Thus, in each combining step, a thread is combined with the combined data value of a group of execution lanes that have not yet contributed to the combined data value for the thread. Moreover, this is done by combining the data value for the thread with the data value for a particular execution lane from the group of execution lanes whose values have been combined and that have not yet contributed to the combined data value result for the thread in question, and in particular with the data value for the execution lane having a particular, in an embodiment selected, in an embodiment predetermined, relative position in the group of execution lanes whose values have been combined in the previous combining step.

The execution lane whose data value is selected for combining with the data value for the thread (execution lane) that is executing the instruction in a combining step can be the execution lane having any particular relative position in the group of execution lanes that (could) store the combined data value that is required.

In an embodiment, the another execution lane selection is based on the order in which the active lanes will be arranged in the set of plural execution lanes when executing thread groups (and in particular when executing thread groups that do not use all the execution lanes).

The Applicants have recognised in this regard that in practice a data processor will tend to always issue threads to the execution lanes of the execution processing circuitry in the same pattern (order), such that any inactive execution lanes will always occupy the same (relative) positions in the execution lanes. This then means that the particular execution lanes to select as the source of the data values for combining can be predetermined based on the known thread issuing pattern for the data processor in question (i.e. without the need to take any positive steps to configure and/or check the thread issuing operation in use).

For example, in the case where the thread group issuing process operates always to issue the threads in a thread group to the execution lanes of the execution processing circuitry from the lowest execution lane upwards, then selecting as the particular position of the execution lane that is to provide the source data value for the combination operation to be the lowest (the lowest numbered) execution lane in the group of execution lanes that the data value is the combination of should ensure that an active lane will be selected, if available. Correspondingly, in the case where the threads are issued to the execution lanes from the highest execution lane downwards, then selecting the highest execution lane in the group of execution lanes that the data value is the combination of should ensure that an active lane will be selected, if available.

Thus, in an embodiment, the sequence of instructions is configured to cause the data processor to select from a group of execution lanes whose values have been combined in the previous combining step and that have not yet contributed to the combined data result for the thread, an end (the lowest or the highest) execution lane in the group of execution lanes, and in an embodiment to select the lowest (numbered) execution lane in the group of execution lanes, as the source lane for the data value to combine with.

Correspondingly, the execution processing circuitry of the data processor is in an embodiment configured to, when executing the sequence of instructions, and in response to the sequence of instructions select from a group of execution lanes whose values have been combined in the previous combining step and that have not yet contributed to the combined data result for the thread, an end (the lowest or the highest) execution lane in the group of execution lanes, and in an embodiment to select the lowest (numbered) execution lane in the group of execution lanes, as the source lane for the data value to combine with.

The instructions in the sequence of instructions can be configured so as to cause the data processor to select the desired another execution lane as the source execution lane for the data value for combining with the data value for the thread (execution lane) that is executing the instructions for a combining step in any suitable and desired manner.

In an embodiment, this is achieved by configuring the instructions to cause the data processor to select as the another execution lane for a combining step, an execution lane in accordance with the following calculation:

lane number of the execution lane whose data value to be combined with=(lane number of execution lane that is executing the sequence of instructions XOR modifier value) AND (bitwise complement (modifier value−1)), where the lane number of the execution lane whose data value to be combined with source lane is the lane number of the another execution lane to retrieve the data value for combining with from (with the execution lanes of the execution processing circuitry being numbered from 0-N (in an embodiment from left to right), where N is the number of threads in a thread group minus 1); the lane number of execution lane that is executing the sequence of instructions is the number of the execution lane that is executing the instruction (using the numbering scheme from 0-N for the execution lanes); and the modifier value is a numerical value that is used to modify the calculation result.

This calculation is performed in binary, and identifies the lane position (lane number) of the selected another execution lane whose data value is to be used for the combining operation. This should be, and is in an embodiment, done for each combining step to be performed.

The modifier value that is used in this operation is in an embodiment progressively increased for each successive combining step, and in an embodiment is set as $2^{n-1}$, where n is the number of the combining step in question. Thus, for the first combining step, the modifier value is in an embodiment 1, for the next combining step, the modifier value is in an embodiment 2, for the next combining step, the modifier value is in an embodiment 4, and so on.

In an embodiment, the modifier value to use is indicated in the respective source execution lane selection instruction that is included in the sequence of instructions for performing the reduction operation (as discussed above).

This operation (at least when using the above modifier values) will have the effect of selecting for the first combining step, the immediately adjacent execution lane (in a pairwise manner), and for each subsequent combining step, of always selecting the execution lane having the lowest position in the execution lane sequence of the group of execution lanes that have contributed to the desired (previously) combined data value. This should then, and does in an embodiment, ensure that an active execution lane (thread) is always selected as the source another execution lane for a data value for a combining step, if available (at least in the case where the threads are assigned to (packed in) the execution lane, from lane 0 upwards).

Other mathematical calculations could be used to select the source another execution lane where it is desired to select other than the lowest (appropriate) execution lane in the execution lane order for each combining step.

The operation in the manner of the technology described herein, in embodiments, will act to combine in the desired manner the initial data values for the threads in a thread group irrespective of whether the thread group uses all of the execution lanes or not, and so can be, and is in an embodiment, used whenever a reduction operation is required to be performed. This simplifies the handling of reduction operations for thread groups, as there is no need to treat thread groups that do not use all of the execution lanes in a different manner to thread groups that do use all of the execution lanes when performing reduction operations. There is also no need to attempt to determine the number of inactive execution lanes or the presence of and position of any inactive execution lanes.

It should also be noted here that while the operation in the manner of the technology described herein will serve to combine appropriately all the data values for the threads in a thread group, in the case where a thread group does not use all of the execution lanes (i.e. one or more of the execution lanes are inactive), then the operation may still operate to combine inactive lanes with the active lanes. (Thus, the technology described herein doesn't preclude selecting an inactive lane, but the technology described herein can, and in an embodiment does, operate to always select an active lane if one is available).

In the case where an inactive lane is selected as the source lane for a combining step for a thread, that can be handled in any desired and appropriate manner, for example, and in an embodiment, in accordance with the normal operation for combining active lanes and inactive lanes in the data processor and data processing system in question. For example, there may be a default operation that is defined in the event where an inactive lane is selected, such as using some form of default or unitary operator and/or data value for the inactive lane.

The sequence of one or more instructions to perform the reduction operation can be included in a program for execution by the data processor in any suitable and desired manner and by any suitable and desired component and element of the data processing system.

This is in an embodiment done in response to identifying that a program includes an instruction or instructions for performing a reduction operation. In an embodiment, the program (source code) that is provided, e.g. by an application on a host processor that requires the data processing, is analysed to determine whether instructions to perform a reduction operation are present, and in response to recognising the presence of a reduction operation in a program to be executed, a sequence of one or more instructions in the manner of the technology described herein to cause the data processor to perform the reduction operation for thread groups in the manner of the technology described herein is included in the program code provided to the data processor for execution.

In an embodiment, this is done by a compiler for the data processor (e.g. for the shader of the graphics processor). Thus the data processing system of the technology described herein in an embodiment comprises a compiler (compiler processing circuitry/circuit) that is operable to recognise the presence of a reduction operation in a program, and to, if so, include in the compiled program code provided to the data processor for execution, a sequence of one or more instructions in the manner of the technology described herein to cause the data processor to perform the reduction operation for a thread group in the manner of the technology described herein.

In these arrangements, the compiler (the compiler processing circuitry/circuit) in an embodiment is part of and executes on a central processing unit (CPU), such as a host processor, of the data processing system, and in an embodiment is part of a driver for the data processor that is executing on the CPU (e.g. host processor). In this case, the compiler and compiled code would run on separate processors within the overall data processing system. However, other arrangements would be possible, such as the compiler running on the same processor as the compiled code, or the compiler being run on a (completely) separate processor such as the program being pre-compiled on a separate system and being distributed in a compiled form.

The compilation process (the compiler) can generate the sequence of instructions of the technology described herein in any suitable and desired manner, e.g., and in an embodiment, using any suitable and desired compiler techniques for that purpose. In an embodiment, the sequence of instructions is inserted by calling a library function and/or wrapped in a library function.

Thus the compiler in an embodiment recognises the presence of a reduction operation in a program to be executed by the data processor (e.g. in the (high level) program code that is provided), e.g. by the application on the host processor that requires the processing by the data processor, and then operates to include in the program code that is provided to the data processor (to the execution processing circuitry on the data processor) for execution, a sequence of instructions in the manner of the technology described herein to cause the data processor to perform the reduction operation for a thread group (and for all thread groups that are to execute the program) in the manner of the technology described herein.

The technology described herein also extends to the operation of a compiler in the manner of the technology described herein (i.e. to identify the presence of a reduction operation and to include an instruction sequence of the form of the technology described herein in the compiled program for execution by the execution processing circuitry of the data processor) per se.

Thus, an embodiment of the technology described herein comprises a method of operating a data processing system, the method comprising:
including in a program to be executed by execution processing circuitry of a data processor, a sequence of one or more instructions for execution by the execution processing circuitry for performing a reduction operation to combine initial data values for the threads in a thread group in accordance with an operation defined for the reduction operation;
the sequence of instructions being operable to, when executed for threads of a thread group executing in execution lanes of the execution processing circuitry, perform for each thread of the thread group that is executing the sequence of instructions:
a first combining step that combines in accordance with the operation defined for the reduction operation, an initial data value for the execution lane for the thread with the initial data value for a selected another execution lane of the execution processing circuitry, and stores the combined data value result of the combining operation for the thread;
and
one or more further combining steps that each combine in accordance with the operation defined for the reduction operation, the stored combined data value result of the previous combining operation for the thread with the combined data value result of the previous combining operation for a selected another execution lane of the execution processing circuitry that has not yet contributed to the stored combined data value result for the thread, and store the combined data value result of the combining operation for the thread,
such that the thread will have stored for it in accordance with the reduction operation, the combination of the initial data values for all the threads of the thread group;
wherein the sequence of instructions is further configured so as to cause the data processor to, when combining a data value for the thread with the combined data value result of a previous combining operation for a selected another execution lane of the execution processing circuitry that has not yet contributed to the stored combined data value result for the thread, select as the another execution lane of the execution processing circuitry that has not yet contributed to the combined data value result for the thread, an execution lane from a group of execution lanes whose values have been combined in the previous combining step and that have not yet contributed to the combined data value result for the thread, and having a particular relative position in the group of execution lanes.

An embodiment of the technology described herein comprises a compiler that compiles programs to generate instructions for execution by execution processing circuitry of a data processor operable to execute instructions to perform processing operations for execution threads, the compiler being configured to:
include in a program to be executed by execution processing circuitry of a data processor, to cause the data processor to perform a reduction operation to combine initial data values for threads in a thread group in accordance with an operation defined for the reduction operation:
a sequence of one or more instructions for execution by the execution processing circuitry for performing the reduction operation, the sequence of instructions being operable to, when executed for each thread of a thread group that is being executed by execution lanes of the execution processing circuitry, perform for each thread of the thread group that is executing the sequence of instructions:
a first combining step that combines in accordance with the operation defined for the reduction operation, an initial data value for the execution lane for the thread with the initial data value for a selected another execution lane of the execution processing circuitry, and stores the combined data value result of the combining operation for the thread;
and
one or more further combining steps that each combine in accordance with the operation defined for the reduction operation, the stored combined data value result of the previous combining operation for the thread with the combined data value result of the previous combining operation for a selected another execution lane of the execution processing circuitry that has not yet contributed to the stored combined data value result for the thread, and store the combined data value result of the combining operation for the thread,
such that the thread will have stored for it in accordance with the reduction operation, the combination of the initial data values for all the threads of the thread group;
wherein the sequence of instructions is further configured so as to cause the data processor to, when combining a data value for the thread with the combined data value result of a previous combining operation for a selected another execution lane of the execution processing circuitry that has not yet contributed to the stored combined data value result for the thread, select as the another execution lane of the execution processing circuitry that has not yet contributed to the combined data value result for the thread, an execution lane from a group of execution lanes whose values have been combined in the previous combining step and that have not yet contributed to the combined data value result for the thread, and having a particular relative position in the group of execution lanes.

As will be appreciated by those skilled in the art, these embodiments of the technology described herein can, and in an embodiment do, include any one or more or all of the features of the technology described herein, as appropriate.

The technology described herein is applicable to any suitable form or configuration of data processor and data processing system.

The technology described herein can be used for all forms of output that a data processor may be used to generate. In the case of a graphics processor (and processing pipeline) this may comprise, for example, compute shading outputs, frames for display, render-to-texture outputs, etc. The output data values from the processing are in an embodiment exported to external, e.g. main, memory, for storage and use.

In an embodiment, the data, e.g. graphics, processing system and/or data, e.g. graphics, processor comprises, and/or is in communication with, one or more memories and/or memory devices that store the data described herein, and/or store software for performing the processes described herein. The data processor may also be in communication with a host processor, and/or with a display for displaying images based on the data generated by the data processor.

In an embodiment, the data processor is part of an overall data processing system that comprises one or more memories and/or memory devices and a host processor (and, optionally, a display). In an embodiment, the host processor is operable to execute applications that require data processing by the data processor, with the data processor operating in the manner of the technology described herein when required to process data by applications executing on the host processor.

Other arrangements would, of course, be possible.

In an embodiment, the various functions of the technology described herein are carried out on a single data processing platform that generates and outputs data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry/circuits, processing logic, microprocessor arrangements, etc., that are operable to perform the various functions, etc., such as appropriately dedicated hardware elements (processing circuitry/circuits) and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the data processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that an embodiment of the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising a data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in an embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the present invention will now be described. These embodiments will be described with specific reference to the use of the present invention in a graphics processor and for graphics shader programs, but as discussed above, the invention is equally applicable to other forms of data processor, and programs.

FIG. 1 shows a typical graphics processing system. An application 2 executing on a host processor 1 will require processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1.

FIG. 2 shows the graphics processing pipeline 3 of the present embodiment in more detail.

The graphics processing pipeline 3 shown in FIG. 2 is a tile-based renderer and will thus produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multi sample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, etc. These shader programs are then translated by a shader language compiler to binary code for the target graphics processing pipeline 3. This may include the creation of one or more intermediate representations of the program within the compiler. The compiler may, e.g., be part of the driver 4, with there being a special API call to cause the compiler to run. The compiler execution can thus be seen as being part of the draw call preparation done by the driver in response to API calls generated by an application. (Other compiler arrangements would, of course, be possible.)

FIG. 3 illustrates this, and shows the shader program being provided in the high level shader programming language 40 by the application 2 to the driver 4, which then compiles 41 the shader program to the binary code 42 for the graphics processing pipeline 3.

As discussed above, each shader in the graphics processing pipeline is a processing stage that performs graphics processing by running small programs for each "work" item in an output to be generated. For each work item to be processed, an execution thread that will execute the corresponding shader program is issued to appropriate programmable processing circuitry that then executes the shader program for the execution thread in question.

The present embodiments relate to systems where threads that are to execute a shader program can be organised into groups ("warps") of threads that are to be run in lockstep, e.g. one instruction at a time.

In the case of the fragment shader 27, for example, the fragment shading program that is being executed may be run once for each sampling position (or point) that is to be processed, with one execution thread being spawned for each sampling position. The sampling positions (and thus accordingly their corresponding execution threads) may be organised into and processed as groups of plural sampling positions (and thus threads), each corresponding to the sampling positions associated with a graphics fragment.

In such arrangements, in order to execute the execution threads of a thread group, e.g., so as to perform a fragment shading operation, the execution threads will be appropriately issued to appropriate functional units, such as arithmetic processing units, to perform the processing operations required by the shader program in question. In the case where threads can be organised into and executed as respective thread groups of plural threads, then typically the functional units will be arranged as plural execution lanes, one for each thread of a thread group.

As such, each functional unit (or set of associated functional units) will be arranged and operable as a plurality of execution lanes, to which respective threads of a thread group can be issued for execution. When a thread group is to be executed, appropriate control logic will issue the relevant data and instruction to be executed to the appropriate execution lanes of a functional unit or set of functional units, so that the instruction in question can be executed for the threads of the thread group by the functional unit(s) in parallel.

Figure 4:
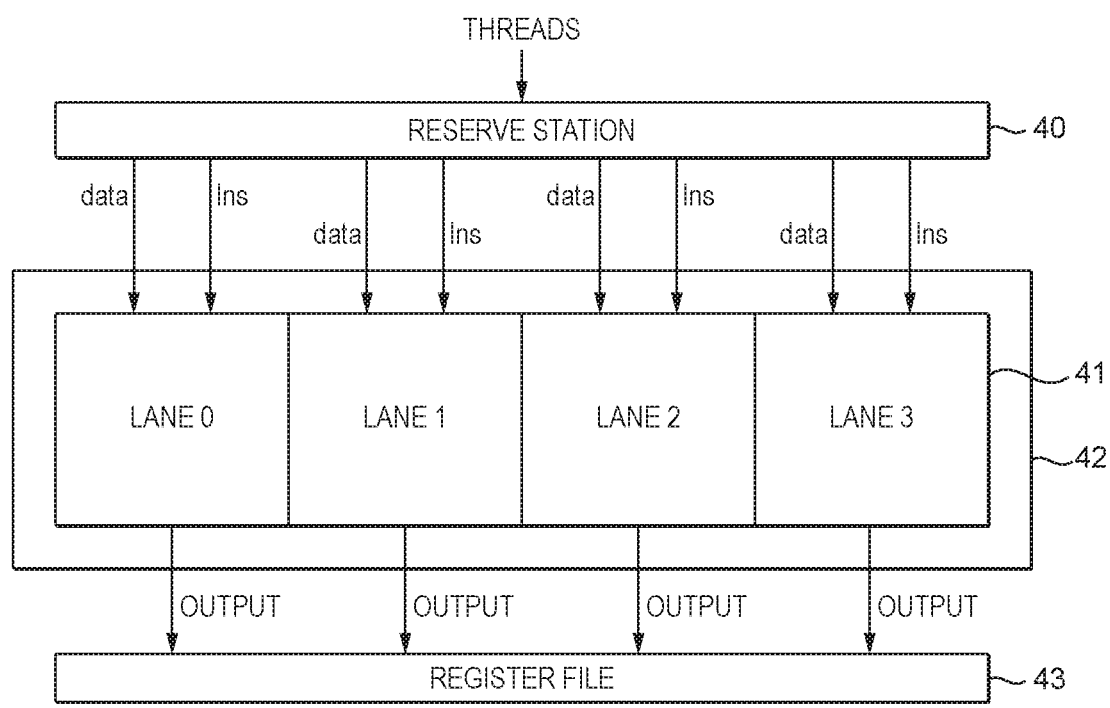
FIG. 4 shows schematically the arrangement of execution lanes in embodiments of the technology described herein.

FIG. 4 illustrates this, and shows execution processing circuitry 42 arranged as four execution lanes 41 (so as to correspond to thread groups having four threads (other arrangements would, of course, be possible)), and appropriate control logic in the form of a "reserve station" 40 for issuing the appropriate data and an instruction for each thread of a thread group to a respective execution lane 41 of the set of execution lanes. (The reserve station (control logic) 40 will receive threads for execution, e.g., from a thread spawner or a thread spawning process of the graphics processor.)

The execution lanes 41 may comprise, for example, one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store-type units (such as blend or store units), etc.

Each execution lane 41 of the execution processing circuitry 42 also has access to (and available to it) a set of plural registers 43 for storing data values associated with and for the execution lane (i.e. for storing data values being processed for the execution thread that the execution lane is currently executing). This then facilitates the handling of execution threads and their data values in an execution lane without the need to (always) require access to memory (to the memory system of the graphics processing system). The registers for the execution lanes can be arranged in register file banks, as desired, and as appropriate.

It is also known to use the shader functionality of graphics processors and graphics processing pipelines for performing more general computing tasks, for example in accordance with compute-shader API's such as OpenCL and Vulkan. In this case, the execution lanes (functional units) of the shader core of the graphics processor will be used to perform more general data processing tasks, that may not specifically relate to the generation of graphics data for a graphics output (e.g. for display)

The present embodiments relate in particular to efficient mechanisms for performing so-called "reduction" operations that may relatively commonly be required when performing compute shading, such as the subgroup reduction operations described in the cl_khr_subgroups extension specification for OpenCL (sub_group_reduce).

In OpenCL an application can submit kernels to a graphics processor to perform a processing operation for a 3-dimensional iteration space called an NDRange (with each iteration (element) in the space being a work item). Each NDRange is partitioned into workgroups, and each workgroup comprises one or more subgroups. Each subgroup may be, e.g., mapped to a thread group (warp) that will be executed by the graphics processor (such that each thread corresponds to a respective work item of the subgroup).

A reduction operation may be performed for respective subgroups, for example, to sum (add) all of the data values for a subgroup (an additive reduction operation), or it may, for example, be to determine the product of (multiply) all of the data values for a subgroup.

One way to perform such a reduction operation would be simply to combine in the manner required the data values for each thread in a thread group (warp) corresponding to the subgroup with the data value of each other thread in the thread group in turn.

The following exemplary instruction sequence shows this process, and shows in particular the progressive combination (addition in this example) of the value of each execution lane (thread in the thread group) in turn. (This instruction sequence performs an additive reduction of the value contained in register r0 of all the lanes for an 8 lane-wide thread group. The result is stored in register r1 and register r2 is used as a scratch register.)

MOVE r1, #0//Initialise the accumulator with the identity element for the reduction
LANE_FETCH.subgroup8.zero r2, r0, #0//Store in this lane's r2 the value of lane 0's r0 ADDITION r1, r1, r2
LANE_FETCH.subgroup8.zero r2, r0, #1//Store in this lane's r2 the value of lane 1's r0 ADDITION r1, r1, r2
LANE_FETCH.subgroup8.zero r2, r0, #2//Store in this lane's r2 the value of lane 2's r0 ADDITION r1, r1, r2
LANE_FETCH.subgroup8.zero r2, r0, #3//Store in this lane's r2 the value of lane 3's r0 ADDITION r1, r1, r2
LANE_FETCH.subgroup8.zero r2, r0, #4//Store in this lane's r2 the value of lane 4's r0 ADDITION r1, r1, r2
LANE_FETCH.subgroup8.zero r2, r0, #5//Store in this lane's r2 the value of lane 5's r0 ADDITION r1, r1, r2
LANE_FETCH.subgroup8.zero r2, r0, #6//Store in this lane's r2 the value of lane 6's r0 ADDITION r1, r1, r2
LANE_FETCH.subgroup8.zero r2, r0, #7//Store in this lane's r2 the value of lane 7's r0 ADDITION r1, r1, r2

This sequence of steps (instructions) is executed for each execution lane in parallel, so that for each execution lane, the values for the other execution lanes will be progressively accumulated.

It can be seen that in this case, the reduction operation requires eight combining steps, as there are eight threads (and execution lanes) to be combined.

In the present embodiments, rather than combining the values in the execution lanes for a subgroup one by one as described above, the values in the execution lanes are combined in a sequence of combining steps that in each combining step, combines the data value for an execution lane with the combined data value from a group of execution lanes that have already been combined and that have not yet contributed to the combined value for the execution lane in question. Moreover, an execution lane having a particular and predetermined relative position (in the present embodiment the lowest relative position) in the group of other execution lanes whose combined value is being used is selected as the source execution lane to combine with.

This is achieved in the present embodiments by selecting as the execution lane whose value is to be combined with in a combining step as follows:

lane number of the execution lane whose data value to be combined with=(lane number of execution lane that is executing the sequence of instructions XOR modifier value) AND (bitwise complement (modifier value−1)), where the lane number of the execution lane whose data value to be combined with source lane is the lane number of the another execution lane to retrieve the data value for combining with from (with the execution lanes of the execution processing circuitry being numbered from 0-N (from left to right), where N is the number of execution lanes minus 1); the lane number of execution lane that is executing the sequence of instructions is the number of the execution lane that is executing the instruction (using the numbering scheme from 0-N for the execution lanes); and the modifier value is a numerical value that is used to modify the calculation result.

This calculation identifies the lane position (lane number) of the selected another execution lane whose data value is to be used for the combining operation. This is done for each combining step to be performed.

The modifier value that is used in this operation is set in the present embodiment as $2^{n-1}$, where n is the number of the combining step in question. Thus, for the first combining step, the modifier value is set to 1, for the next combining step, the modifier value is set to 2, for the next combining step, the modifier value is set to 4, and so on.

This operation is triggered in the present embodiments by including in the instruction sequence used to trigger and perform the reduction operation, a LANE_FETCH instruction (a source execution lane selection instruction) configured as follows:
+LANE_FETCH {.subgroup} {.inactive_result}{.lane_op}<dest>, <src0>, <src1>
where:
.subgroup is one of (subgroup2, subgroup4, subgroup8) and is used to select the subgroup size (in this embodiment it is set to the thread group (warp) size).
.lane_op specifies how the value in src1 will be combined with the current lane index in order to select the source lane whose data value will be combined with the data value for this lane (this field is set to "accumulate" to specify the source lane calculation above—it can take other values to specify other operations, if desired).
.inactive_result specifies the value returned for an inactive lane, or for a lane index outside the current subgroup.
<dest> is the destination register.
<src0> is the source register to fetch.
<src1> is the index of the warp lane from which to retrieve the register value. The interpretation of this value depends on the lane_op and subgroup fields, and in the case of the source lane "accumulate" calculation above is used as the modifier value in the calculation (thus in this embodiment, the modifier value to use is indicated in the respective source execution lane selection LANE_FETCH instruction that is included in the sequence of instructions for performing the reduction operation).

This LANE_FETCH instruction will operate to select the desired source execution lane and transfer the required data value from that lane to the execution lane that is executing the instruction.

The following exemplary instruction sequence shows using the above LANE_FETCH instruction to select the source execution lane for a combining operation in accordance with the above source lane calculation of the present embodiments to additively combine (reduce) the data values for an 8-lane wide thread group (warp).

Thus in this case, the subgroup field of the LANE_FETCH instruction is set to eight to indicate that there are eight threads to be combined, and the lane_op field is set to "accumulate" to indicate that the above described calculation should be used to determine the source lane for the data value for an execution lane for each combining step.

Again, this sequence of instructions is executed for each execution lane in parallel, so that for each execution lane, the values for the other execution lanes will be progressively accumulated.

LANE_FETCH.subgroup8.zero.accumulate r2, r0, #1//This instruction operates to store in this lane's r2 the value of r0 from the corresponding lane within its pair of adjacent execution lanes ADDITION r1, r0, r2
LANE_FETCH.subgroup8.zero.accumulate r2, r0, #2//This instruction operates to store in this lane's r2 the value of r0 from the lowest index lane of the other pair in the "quad" of adjacent execution lanes that the lane belongs to ADDITION r1, r1, r2
LANE_FETCH.subgroup8.zero.accumulate r2, r0, #4//This instruction operates to store in this lane's r2 the value of r0 from the lowest index lane of the other quad of adjacent execution lanes within the group of 8 threads that are being combined ADDITION r1, r1, r2

The table below shows which lane is selected as the source lane for the combining operation in each combining step in accordance with the above calculation.

| Execution lane executing instructions | First combining step, modifier value Src1 = 1 selected source execution lane for combining with | Second combining step, modifier value Src1 = 2 selected source execution lane for combining with | Third combining step, modifier value Src1 = 4 selected source execution lane for combining with |
|---|---|---|---|
| 0 | 1 | 2 | 4 |
| 1 | 0 | 2 | 4 |
| 2 | 3 | 0 | 4 |
| 3 | 2 | 0 | 4 |
| 4 | 5 | 6 | 0 |
| 5 | 4 | 6 | 0 |
| 6 | 7 | 4 | 0 |
| 7 | 6 | 4 | 0 |

Figure 5:
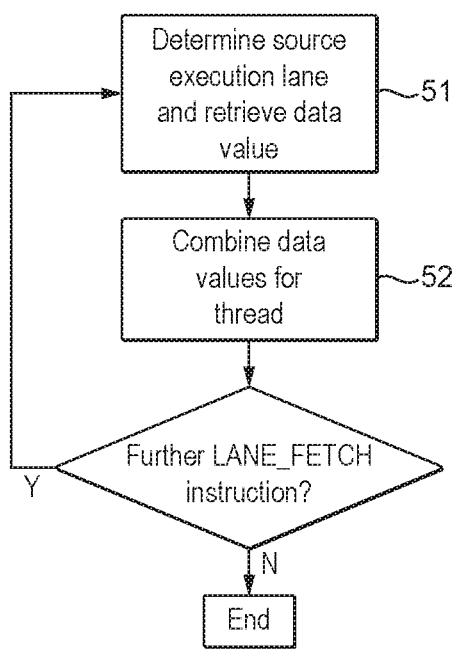
FIGS. 5 and 6 show the performance of a reduction operation for a thread group in an embodiment of the technology described herein.

FIG. 5 is a flow chart illustrating the execution of the above sequence of instructions by an execution thread. (As discussed above, each thread will execute the instruction sequence in parallel, in a respective execution lane, in lockstep with the other threads that are executing the instruction sequence.)

As shown in FIG. 5, the process starts with the thread executing the first LANE_FETCH source execution lane selection instruction, and in response to this, calculates, using the modifier value 1, the source execution lane that it is to combine its data value with, and stores the value from that lane in its "working" r2 register (step 51).

The thread then executes the mathematical operation, ADDITION, instruction, to sum its current accumulated value with the value fetched from the selected source execution lane (step 52). This completes the first combining step.

If further combining steps are required (step 53), the thread then performs the next combining step, by again first executing the appropriate source execution lane selection LANE_FETCH instruction, but in this case using the modifier value 2, and retrieves the appropriate data value from the selected source execution lane. This is again followed by the next addition instruction, to combine the fetched data value with the thread's current data value. This completes the second combining step.

In the present case, the thread will then perform the third (and in this example, final) combining step, by again executing the next source execution lane selection LANE_FETCH instruction, but this time using the modifier value 4, and adds the retrieved data value to its current data value in response to the final addition instruction.

At this point, the thread stores the appropriately accumulated value for all eight threads (execution lanes) in the thread group.

Figure 6:
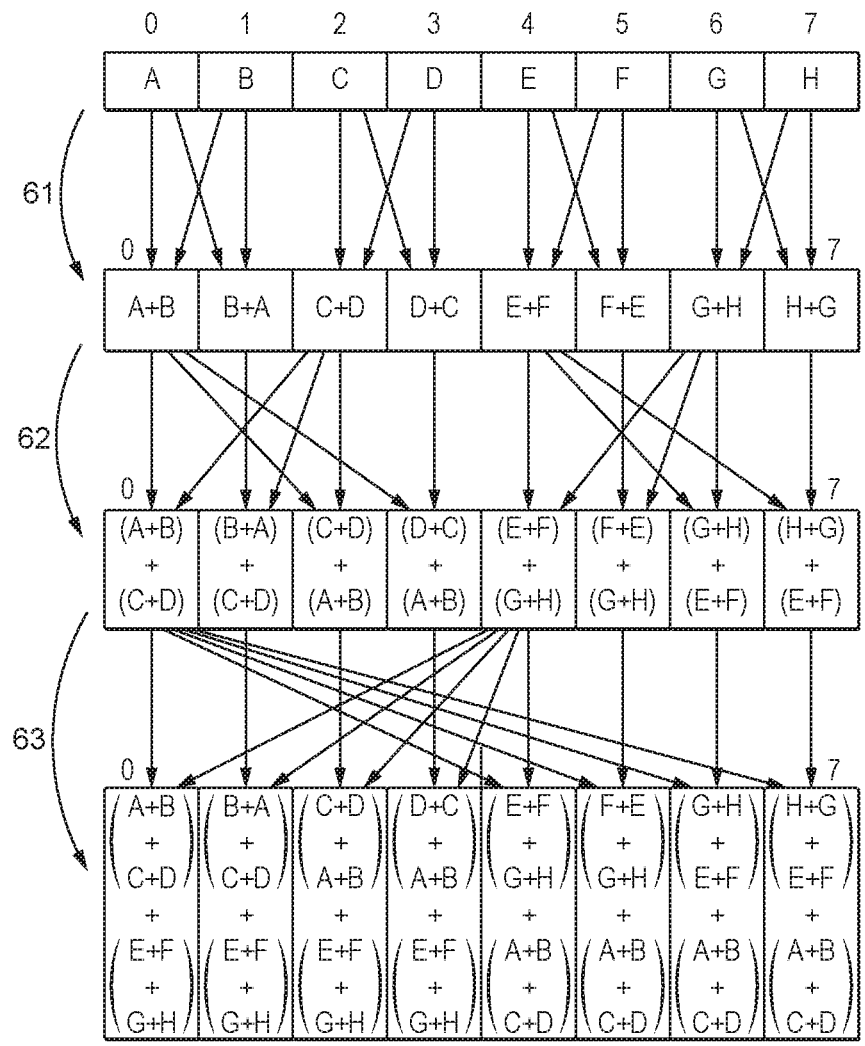

FIG. 6 illustrates the execution of the above exemplary instructions sequence to "reduce" an exemplary thread group 60 of 8 threads, executing in execution lanes 0-7, and having exemplary initial data values A-H respectively.

As shown in FIG. 6 and illustrated in the table above, the first combining step 61 triggered by the instruction sequence combines respective adjacent pairs of the execution lanes, after which, as shown in FIG. 6, execution lane 0 will store the combination of lanes 0 and 1 (A+B), execution lane 1 will store the combination of lanes 1 and 0 (B+A), execution lane 2 will store the combination of lanes 2 and 3 (C+D), and so on.

There is then a second combining step 62 which in this case, and in accordance with the operation of the present embodiments, combines the current value in lane 0 with the value in lane 2 (C+D), combines the current value in lane 1 with the value in lane 2 (C+D) and so on, as shown in FIG. 6. (It can be seen in this case that lanes 0 and 1 could be combined with either lanes 2 or 3, but the operation is so as to combine them with the lower lane of lanes 2 and 3, namely lane 2 (and correspondingly for the other execution lanes).)

There is then a final combining step (as 8 lanes need combining) 63. In this case, as shown in FIG. 6, each of lanes 0, 1, 2 and 3 are combined with the value in lane 4 (i.e. the lowest lane in the combined group of lanes 4-7 that have yet to be combined with any of lanes 0-3), and correspondingly, each of lanes 4-7 is combined with lane 0 (being the lowest lane in the combined group of lanes 0-3 whose values have yet to be combined with the values in lanes 4-7).

It can be seen that in this case, the reduction operation requires three combining steps to combine the eight threads (and eight execution lanes) to be combined.

Thus the combining operation is performed in a more efficient manner, requiring fewer combing steps, than, for example, in the "simple" combining operation described above.

It can also be seen that the execution lane operation combining in this embodiment has the effect of, for each execution lane, selecting for the first combining step, the immediately adjacent execution lane (in a pairwise manner), and for each subsequent combining step, of always selecting the execution lane having the lowest position in the execution lane sequence of the group of execution lanes that have contributed to the desired (previously) combined data value.

This will then, in the case where the threads are assigned to (packed in) the execution lanes from lane 0 upwards (which will be the case in uniform control flow when all the participating threads are packed at the beginning of the execution lanes), ensure that an active execution lane is always selected as the source another execution lane for a data value for a combining step, if available.

The Applicants have recognised in this regard that in graphics processing systems that group execution threads executing program instructions together into thread groups of plural execution threads, it can be the case that not all the execution lanes will be active when executing a thread group. This can be because the thread group does not fill the (use all of the) execution lanes (such that an execution lane is not executing a thread) or because the thread that a lane is executing is currently inactive. If the control flow is always uniform, then threads are always active and lanes are active when executing a thread.

For example, in the case of an OpenCL kernel running on a graphics processor, where all the subgroups in a work group of work items are to be subjected to reduction operation, it may be the case that the work items for the work group will not be divisible into respective thread groups for execution by the execution processing circuitry of a graphics processor in an integer manner, such that, for example, there will be a need to execute a "final" thread group (subgroup) for the work group that contains the "remainder" of the work items of the work group, and so will accordingly not completely "fill" all the available execution lanes, such that there will be one or more inactive execution lanes when that final thread group (subgroup) is executed.

As discussed above, the operation of the present embodiment, in the case where the threads are packed in the execution lanes from the lowest lane upwards, will ensure that an active lane is always selected for a combining operation if available. Thus the embodiment will act to combine in the initial data values for the threads in a thread group in the required manner, even if the thread group does not use all of the execution lanes.

For example, in the example shown in FIG. 6, if, for example, lanes 6 and 7 were inactive, then as shown in FIG. 6, the combining operation would operate to combine execution lanes 0 to 3 with execution lane 4 in the final combining step (and not execution lane 6 or 7).

It should also be noted here that while the operation in the manner of the present embodiments will serve to combine appropriately all the data values for the threads in a thread group, in the case where a thread group does not fill all of the execution lanes (i.e. one or more of the execution lanes are inactive), then the operation may still operate to combine inactive lanes with the active lanes.

For example, in the above example where lanes 6 and 7 are inactive, the first combining step will attempt to combine lane 6 with lane 7, and lane 7 with lane 6, and the second combining step will attempt to combine lane 4 with lane 6 and lane 5 with lane 6 (and lane 6 with lane 4, and lane 7 with lane 4).

In the case where an inactive lane is selected as the source lane for a combining step for a thread, that is handled in the present embodiments in accordance with the inactive result field in the LANE_FETCH instruction. Thus in the present embodiments, an instruction lane is treated as having the data value "0" (as shown in the instruction sequence above). (In general the value returned for an inactive lane is set to be the identity element for the reduction operation, so "0" for addition, "1" for multiplication, etc.)

In the present embodiments, the sequence of instructions for performing the operation is included in the shader program (instruction stream) for execution by the execution processing circuitry of the graphics processor by the shader compiler for the graphics processor.

The compiler 5 may, e.g., run on the host processor 1 of the data processing system that includes the graphics processor (see FIG. 1). (The compiler may, e.g., be part of the driver 4, with there, e.g. being a special API call to cause the compiler to run. The compiler execution can thus be part of the preparation done by the driver in response to API calls generated by an application). However, other arrangements would be possible, such as the compiler running on the same processor as the compiled code, or the compiler being run on a separate processor, such as the program being pre-compiled on a separate system and being distributed in a compiled form.

Figure 7:
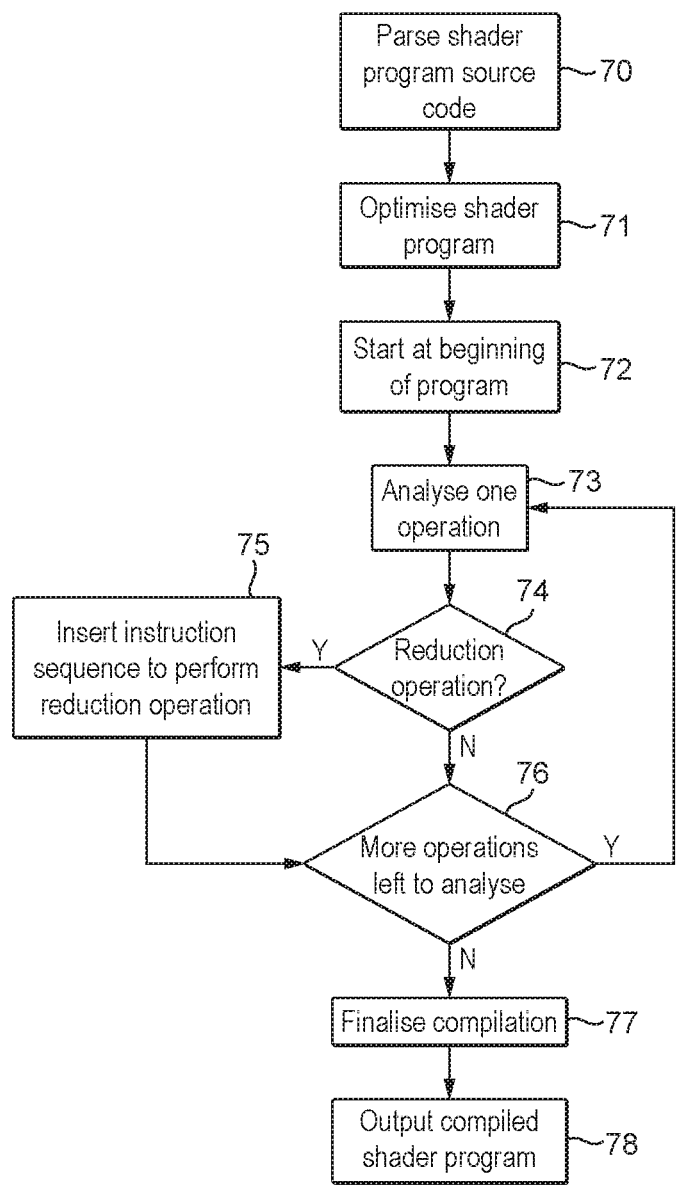
FIG. 7 shows schematically the compilation of a shader program in an embodiment of the technology described herein.

FIG. 7 shows schematically an embodiment of the operation of the compiler to include a "reduction operation" instruction sequence in a shader program to be executed by the graphics processor.

The shader compiler will receive a shader program to be compiled in a high level programming language (step 70), and, as shown in FIG. 7, after optimising the shader program (step 71), analyse the shader program source code to determine if it includes any reduction operations (steps 72, 73, 74).

If so, the compiler includes in the compiled program code the appropriate sequence of instructions in the manner of the present embodiments for performing the reduction operation(s) (step 75). This is done for all the reduction operations that the shader program includes (step 76). The sequence of instructions for performing the reduction operation may be implemented as a library function that directly inserts the instruction sequence in response to the presence of a reduction operation (so: sub_group_reduce_<op>=>instruction code sequence).

Once all the shader program instructions have been analysed, the compilation of the shader program can be finalised (step 77) and the compiled shader program output to the graphics processor for execution (step 78).

The operation in the manner of the technology described herein, in an embodiment, will act to combine in a more efficient manner the initial data values for the threads in a thread group, irrespective of whether the thread group uses all of the execution lanes or not. This, inter alia, simplifies the handling of reduction operations for thread groups, as there is no need to treat thread groups that will not use all of the execution lanes in a different manner to thread groups that will use all of the execution lanes when performing reduction operations.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system, the data processing system including:

a data processor operable to execute programs to perform data processing operations and in which execution threads executing a program to perform data processing operations may be grouped together into thread groups in which the plural threads of a thread group can each execute a set of instructions in lockstep;

the data processor comprising an execution processing circuit operable to execute instructions to perform processing operations for execution threads executing a program, the execution processing circuit being configured as a plurality of execution lanes, each execution lane being operable to perform processing operations for a respective execution thread of a thread group;

the method comprising:

to cause the data processor to perform a reduction operation to combine initial data values for the threads in a thread group in accordance with an operation defined for the reduction operation:

including in a program to be executed by the execution processing circuit of the data processor, a sequence of one or more instructions for execution by the execution processing circuit for performing the reduction operation, the sequence of instructions being operable to, when executed for each thread of a thread group that is being executed by the execution lanes of the execution processing circuit, perform for each thread of the thread group that is executing the sequence of instructions:

a first combining step that combines in accordance with the operation defined for the reduction operation, an initial data value for the execution lane for the thread with the initial data value for a selected another execution lane of the execution processing circuit, and stores the combined data value result of the combining operation for the thread;

and one or more further combining steps that each combine in accordance with the operation defined for the reduction operation, the stored combined data value result of the previous combining operation for the thread with the combined data value result of the previous combining operation for a selected another execution lane of the execution processing circuit that has not yet contributed to the stored combined data value result for the thread, and store the combined data value result of the combining operation for the thread, such that the thread will have stored for it in accordance with the reduction operation, the combination of the initial data values for all the threads of the thread group;

wherein the sequence of instructions is further configured so as to cause the data processor to, when combining a data value for the thread with the combined data value result of a previous combining operation for a selected another execution lane of the execution processing circuit that has not yet contributed to the stored combined data value result for the thread, select as the another execution lane of the execution processing circuit that has not yet contributed to the combined data value result for the thread, an execution lane from a group of execution lanes whose values have been combined in the previous combining step and that have not yet contributed to the combined data value result for the thread, and having a particular relative position in the group of execution lanes;

the method further comprising:

providing the program, including the sequence of one or more instructions for performing the reduction operation, to the data processor for execution by the execution processing circuit of the data processor;

issuing a group of execution threads to the execution processing circuit to execute the program for the execution threads of the thread group;

and the execution processing circuit of the data processor executing the program, including the sequence of one or more instructions for performing the reduction operation, for the group of execution threads, using a respective execution lane of the execution processing circuit for each thread of the thread group;

wherein the executing the program for the threads of the thread group comprises, in response to the sequence of one or more instructions for performing the reduction operation, performing for each thread in the thread group:
a first combining step that combines in accordance with the operation defined for the reduction operation, an initial data value for the execution lane for the thread with the initial data value for a selected another execution lane of the execution processing circuit, and stores the combined data value result of the combining operation for the thread;
and
one or more further combining steps that each combine in accordance with the operation defined for the reduction operation, the stored combined data value result of the previous combining operation for the thread with the combined data value result of the previous combining operation for a selected another execution lane of the execution processing circuit that has not yet contributed to the stored combined data value result for the thread, and store the combined data value result of the combining operation for the thread,
such that the thread has stored for it in accordance with the reduction operation, the combination of the initial data values for all the threads of the thread group;
wherein the executing the program for a thread of the thread group further comprises, in response to the sequence of one or more instructions for performing the reduction operation:
when combining a data value for the thread with the combined data value result of a previous combining operation for a selected another execution lane of the execution processing circuit that has not yet contributed to the stored combined data value result for the thread, selecting as the another execution lane of the execution processing circuit that has not yet contributed to the combined data value result for the thread, an execution lane from a group of execution lanes whose values have been combined in the previous combining step and that have not yet contributed to the combined data value result for the thread, and having a particular relative position in the group of execution lanes;
wherein the sequence of instructions is operable to cause the execution processing circuit to select the execution lane from a group of execution lanes whose values have been combined in the previous combining step and that have not yet contributed to the combined data value result for the thread that is selected when combining a data value for a thread with the combined data value result of a previous combining operation for a selected another execution lane of the execution processing circuit in accordance with the following calculation:

lane number of the execution lane whose data value to be combined with=(lane number of execution lane that is executing the sequence of instructions XOR modifier value) AND (bitwise complement (modifier value−1)), where the lane number of the execution lane whose data value to be combined with source lane is the lane number of the another execution lane to retrieve the data value for combining with from; the lane number of execution lane that is executing the sequence of instructions is the number of the execution lane that is executing the instruction; and the modifier value is a numerical value that is used to modify the calculation result.

2. The method of claim 1, wherein the sequence of instructions is operable to cause the execution processing circuit to combine in the first combining step the data values for respective pairs of execution lanes, and to combine in the next combining step, the data values from one pair of execution lanes that were combined in the first step, with the data values for a different pair of execution lanes that were combined in the first step.

3. The method of claim 1, wherein the sequence of instructions that is used to perform the reduction operation comprises a sequence of respective pairs of instructions, with each pair of instructions performing a respective combining step.

4. The method of claim 3, wherein the first instruction in a pair of instructions selects a source execution lane whose data value is to be combined with the data value for the execution lane that is executing the instruction, and the second instruction in the pair of instructions then performs the operation for the reduction operation using the data value from the selected source execution lane and the data value for the execution lane that is executing the instructions.

5. The method of claim 1, wherein the execution lane from a group of execution lanes whose values have been combined in the previous combining step and that have not yet contributed to the combined data value result for the thread that is selected when combining a data value for the thread with the combined data value result of a previous combining operation for a selected another execution lane of the execution processing circuit, comprises an execution lane at an end of the group of execution lanes.

6. The method of claim 5, wherein the execution lane from a group of execution lanes whose values have been combined in the previous combining step and that have not yet contributed to the combined data value result for the thread that is selected when combining a data value for the thread with the combined data value result of a previous combining operation for a selected another execution lane of the execution processing circuit, comprises the lowest execution lane of the group of execution lanes.

7. The method of claim 1, wherein the modifier value is set as $2^{n-1}$, where n is the number of the combining step.

8. A data processing system, the data processing system comprising:
a data processor operable to execute programs to perform data processing operations and in which execution threads executing a program to perform data processing operations may be grouped together into thread groups in which the plural threads of a thread group can each execute a set of instructions in lockstep;
the data processor comprising an execution processing circuit operable to execute instructions to perform processing operations for execution threads executing a program, the execution processing circuit being configured as a plurality of execution lanes, each execution lane being operable to perform processing operations for a respective execution thread of a thread group;
the data processing system further comprising:
a processing circuit configured to include in a program to be executed by the execution processing circuit of the data processor, to cause the data processor to perform a reduction operation to combine initial data values for the threads in a thread group in accordance with an operation defined for the reduction operation:
a sequence of one or more instructions for execution by the execution processing circuit for performing the reduction operation, the sequence of instructions being operable to, when executed for each thread of a thread group that is being executed by the execution lanes of the execution processing circuit, perform for each thread of the thread group that is executing the sequence of instructions:
a first combining step that combines in accordance with the operation defined for the reduction operation, an initial data value for the execution lane for the thread with the initial data value for a selected another execution lane of the execution processing circuit, and stores the combined data value result of the combining operation for the thread;
and
one or more further combining steps that each combine in accordance with the operation defined for the reduction operation, the stored combined data value result of the previous combining operation for the thread with the combined data value result of the previous combining operation for a selected another execution lane of the execution processing circuit that has not yet contributed to the stored combined data value result for the thread, and store the combined data value result of the combining operation for the thread,
such that the thread will have stored for it in accordance with the reduction operation, the combination of the initial data values for all the threads of the thread group;
wherein the sequence of instructions is further configured so as to cause the data processor to, when combining a data value for a thread with the combined data value result of a previous combining operation for a selected another execution lane of the execution processing circuit that has not yet contributed to the stored combined data value result for the thread, select as the another execution lane of the execution processing circuit that has not yet contributed to the combined data value result for the thread, an execution lane from a group of execution lanes whose values have been combined in the previous combining step and that have not yet contributed to the combined data value result for the thread, and having a particular relative position in the group of execution lanes;
and a processing circuit operable to:
provide the program, including the sequence of one or more instructions for performing the reduction operation, to the data processor for execution by the execution processing circuit of the data processor;
the data processor further comprising:
a thread issuing circuit operable to issue a group of execution threads to the execution processing circuit to execute the program for the execution threads of the thread group;
wherein the execution processing circuit of the data processor is configured to:
when executing the program, including the sequence of one or more instructions for performing the reduction operation, for a group of execution threads, using a respective execution lane of the execution processing circuit for each thread of the thread group, in response to the sequence of one or more instructions for performing the reduction operation, perform for each thread in the thread group:
a first combining step that combines in accordance with the operation defined for the reduction operation, an initial data value for the execution lane for the thread with the initial data value for a selected another execution lane of the execution processing circuit, and stores the combined data value result of the combining operation for the thread;
and
one or more further combining steps that each combine in accordance with the operation defined for the reduction operation, the stored combined data value result of the previous combining operation for the thread with the combined data value result of the previous combining operation for a selected another execution lane of the execution processing circuit that has not yet contributed to the stored combined data value result for the thread, and store the combined data value result of the combining operation for the thread,
such that the thread has stored for it in accordance with the reduction operation, the combination of the initial data values for all the threads of the thread group;
wherein the execution processing circuit is further configured to, in response to the sequence of instructions, when combining a data value for a thread with the combined data value result of a previous combining operation for a selected another execution lane of the execution processing circuit that has not yet contributed to the stored combined data value result for the thread, select as the another execution lane of the execution processing circuit that has not yet contributed to the combined data value result for the thread, an execution lane from a group of execution lanes whose values have been combined in the previous combining step and that have not yet contributed to the combined data value result for the thread, and having a particular relative position in the group of execution lanes;
wherein the sequence of instructions is operable to cause the execution processing circuit to select the execution lane from a group of execution lanes whose values have been combined in the previous combining step and that have not yet contributed to the combined data value result for the thread that is selected when combining a data value for a thread with the combined data value result of a previous combining operation for a selected another execution lane of the execution processing circuit in accordance with the following calculation:

lane number of the execution lane whose data value to be combined with=(lane number of execution lane that is executing the sequence of instructions XOR modifier value) AND (bitwise complement (modifier value−1)), where the lane number of the execution lane whose data value to be combined with source lane is the lane number of the another execution lane to retrieve the data value for combining with from; the lane number of execution lane that is executing the sequence of instructions is the number of the execution lane that is executing the instruction; and the modifier value is a numerical value that is used to modify the calculation result.

9. The system of claim 8, wherein the sequence of instructions is operable to cause the execution processing circuit to combine in the first combining step the data values for respective pairs of execution lanes, and to combine in the next combining step, the data values from one pair of execution lanes that were combined in the first step, with the data values for a different pair of execution lanes that were combined in the first step.

10. The system of claim 8, wherein the sequence of instructions that is used to perform the reduction operation comprises a sequence of respective pairs of instructions, with each pair of instructions performing a respective combining step.

11. The system of claim 10, wherein the first instruction in a pair of instructions selects a source execution lane whose data value is to be combined with the data value for the execution lane that is executing the instruction, and the second instruction in the pair of instructions then performs the operation for the reduction operation using the data value from the selected source execution lane and the data value for the execution lane that is executing the instructions.

12. The system of claim 8, wherein the execution lane from a group of execution lanes whose values have been combined in the previous combining step and that have not yet contributed to the combined data value result for the thread that is selected when combining a data value for the thread with the combined data value result of a previous combining operation for a selected another execution lane of the execution processing circuit, comprises an execution lane at an end of the group of execution lanes.

13. The system of claim 12, wherein the execution lane from a group of execution lanes whose values have been combined in the previous combining step and that have not yet contributed to the combined data value result for the thread that is selected when combining a data value for the thread with the combined data value result of a previous combining operation for a selected another execution lane of the execution processing circuit, comprises the lowest execution lane of the group of execution lanes.

14. The system of claim 8, wherein the modifier value is set as $2^{n-1}$, where n is the number of the combining step.

15. The system of claim 8, comprising a compiler operable to recognise the presence of a reduction operation in a program, and to, in response to recognising the presence of a reduction operation in a program, include in the compiled program code provided to the data processor for execution, the sequence of one or more instructions to cause the data processor to perform the reduction operation for a thread group.

16. A data processor, the data processor:
being operable to execute programs to perform data processing operations and in which execution threads executing a program to perform data processing operations may be grouped together into thread groups in which the plural threads of a thread group can each execute a set of instructions in lockstep;
and comprising an execution processing circuit operable to execute instructions to perform processing operations for execution threads executing a program, the execution processing circuit being configured as a plurality of execution lanes, each execution lane being operable to perform processing operations for a respective execution thread of a thread group;
wherein the execution processing circuit of the data processor is configured to:
in response to a sequence of one or more instructions included in a program, perform for each thread in a group of execution threads being executed using a respective execution lanes of the execution processing circuit:
a first combining step that combines in accordance with an operation, an initial data value for the execution lane for the thread with the initial data value for a selected another execution lane of the execution processing circuit, and stores the combined data value result of the combining operation for the thread;
and
one or more further combining steps that each combine in accordance with the operation, the stored combined data value result of the previous combining operation for the thread with the combined data value result of the previous combining operation for a selected another execution lane of the execution processing circuit that has not yet contributed to the stored combined data value result for the thread, and store the combined data value result of the combining operation for the thread, such that the thread has stored for it the combination of the initial data values for all the threads of the thread group;
wherein the execution processing circuit is further configured to, in response to the sequence of instructions, when combining a data value for a thread with the combined data value result of a previous combining operation for a selected another execution lane of the execution processing circuit that has not yet contributed to the stored combined data value result for the thread, select as the another execution lane of the execution processing circuit that has not yet contributed to the combined data value result for the thread, an execution lane from a group of execution lanes whose values have been combined in the previous combining step and that have not yet contributed to the combined data value result for the thread, and having a particular relative position in the group of execution lanes
wherein the execution processing circuit is further configured to, in response to the sequence of instructions, select the execution lane from a group of execution lanes whose values have been combined in the previous combining step and that have not yet contributed to the combined data value result for the thread that is selected when combining a data value for a thread with the combined data value result of a previous combining operation for a selected another execution lane of the execution processing circuit in accordance with the following calculation:

lane number of the execution lane whose data value to be combined with=(lane number of execution lane that is executing the sequence of instructions XOR modifier value) AND (bitwise complement (modifier value−1)), where the lane number of the execution lane whose data value to be combined with source lane is the lane number of the another execution lane to retrieve the data value for combining with from; the lane number of execution lane that is executing the sequence of instructions is the number of the execution lane that is executing the instruction; and the modifier value is a numerical value that is used to modify the calculation result.

17. A non-transitory computer readable storage medium storing computer software code, which when executing on a processor, performs a method of operating a data processing system, the method comprising:
including in a program to be executed by an execution processing circuit of a data processor, a sequence of one or more instructions for execution by the execution processing circuit for performing a reduction operation to combine initial data values for the threads in a thread group in accordance with an operation defined for the reduction operation;
the sequence of instructions being operable to, when executed for threads of a thread group executing in execution lanes of the execution processing circuit, perform for each thread of the thread group that is executing the sequence of instructions:
a first combining step that combines in accordance with the operation defined for the reduction operation, an initial data value for the execution lane for the thread with the initial data value for a selected another execution lane of the execution processing circuit, and stores the combined data value result of the combining operation for the thread;
and
one or more further combining steps that each combine in accordance with the operation defined for the reduction operation, the stored combined data value result of the previous combining operation for the thread with the combined data value result of the previous combining operation for a selected another execution lane of the execution processing circuit that has not yet contributed to the stored combined data value result for the thread, and store the combined data value result of the combining operation for the thread,
such that the thread will have stored for it in accordance with the reduction operation, the combination of the initial data values for all the threads of the thread group;
wherein the sequence of instructions is further configured so as to cause the data processor to, when combining a data value for the thread with the combined data value result of a previous combining operation for a selected another execution lane of the execution processing circuit that has not yet contributed to the stored combined data value result for the thread, select as the another execution lane of the execution processing circuit that has not yet contributed to the combined data value result for the thread, an execution lane from a group of execution lanes whose values have been combined in the previous combining step and that have not yet contributed to the combined data value result for the thread, and having a particular relative position in the group of execution lanes;
wherein the sequence of instructions is operable to cause the data processor to select the execution lane from a group of execution lanes whose values have been combined in the previous combining step and that have not yet contributed to the combined data value result for the thread that is selected when combining a data value for a thread with the combined data value result of a previous combining operation for a selected another execution lane of the execution processing circuit in accordance with the following calculation:

lane number of the execution lane whose data value to be combined with=(lane number of execution lane that is executing the sequence of instructions XOR modifier value) AND (bitwise complement (modifier value−1)), where the lane number of the execution lane whose data value to be combined with source lane is the lane number of the another execution lane to retrieve the data value for combining with from; the lane number of execution lane that is executing the sequence of instructions is the number of the execution lane that is executing the instruction; and the modifier value is a numerical value that is used to modify the calculation result.

* * * * *